Patented July 3, 1928.

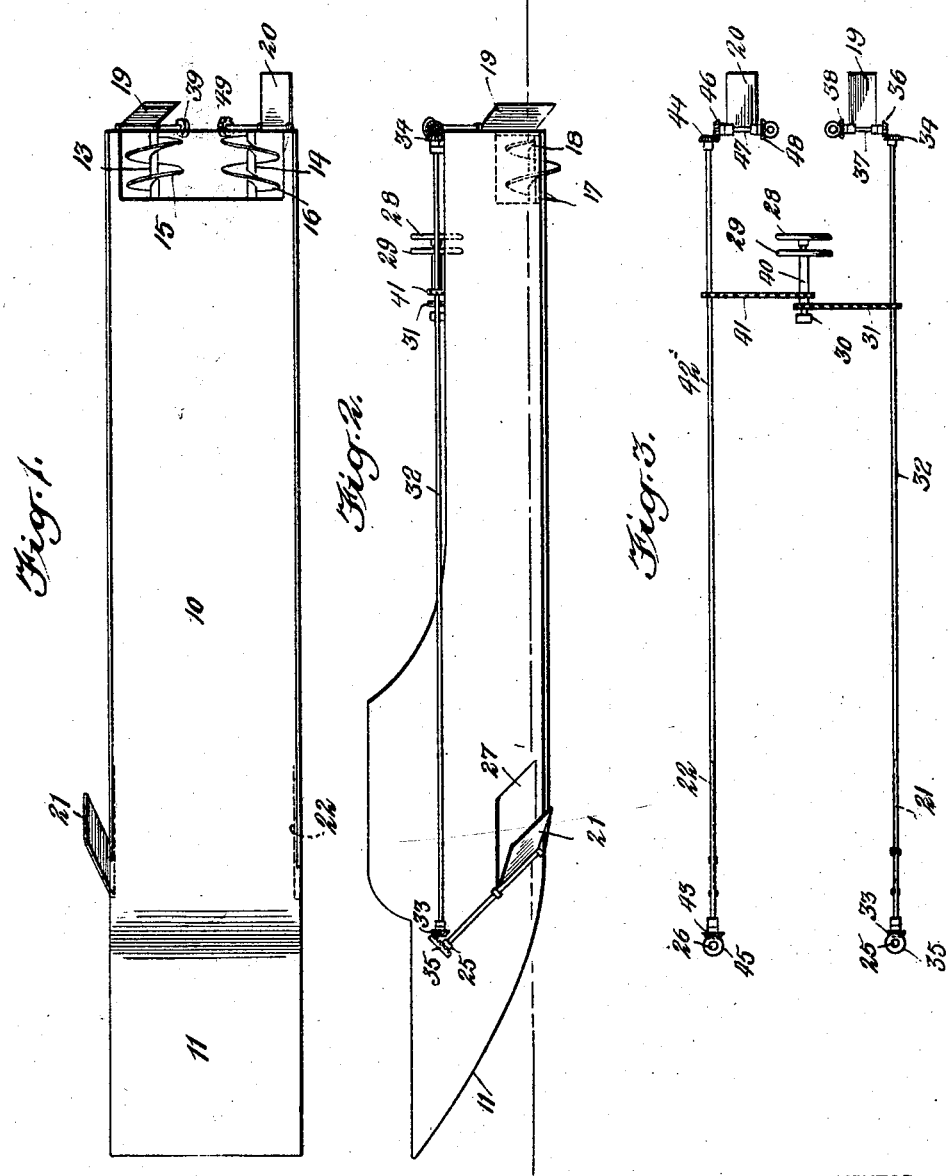

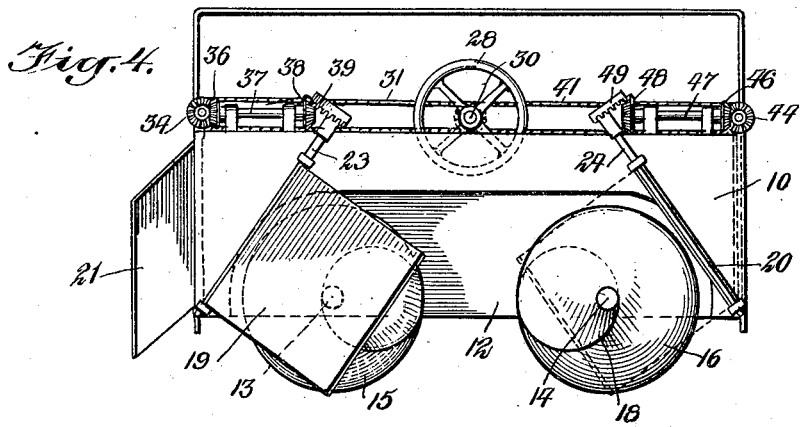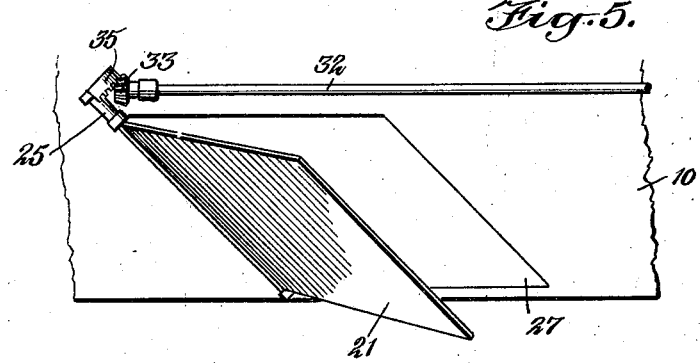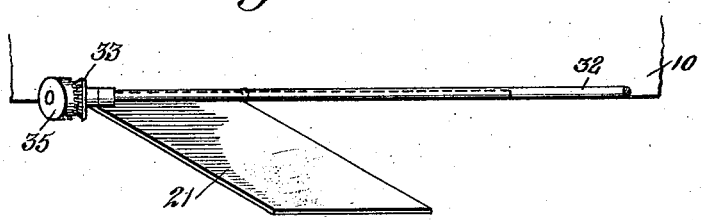

1,676,158

UNITED STATES PATENT OFFICE.

WILLIAM J. ROE, OF NEWBURGH, NEW YORK.

PROPELLING AND STEERING MEANS FOR POWER SPEED BOATS.

Application filed September 30, 1926. Serial No. 138,750.

This invention relates to water-craft, and has particular reference to a propelling and steering means especially designed for power speed boats.

One of the principal objects of the invention is to provide a propelling and steering means which will offer a minimum of resistance whereby a maximum speed may be obtained from the power employed to drive the propelling means.

More specifically the invention comprehends a propelling means in the nature of a pair of propeller shafts having continuous oppositely spiralled blades which are so positioned as to dispose only the lower portion or half thereof in the water and the upper portion or half above the water line, and in which the leading and following ends of said blades are tapered off to eliminate undue disturbance of said ends in entering or leaving the water.

The invention further contemplates a steering mechanism including a pair of laterally spaced rear rudder blades and forward side deflector blades, each deflector blade and its corresponding rudder blade being coupled together for movement in unison whereby to facilitate the making of a shorter turn and for reducing to an absolute minimum the possibility of upsetting in making a turn.

The invention further aims to provide a propelling and steering means as set forth, which is not unduly complicated, hence which is comparatively inexpensive to produce, and which is highly efficient in its purpose.

With the above recited and other objects in view, reference is had to the following specification and accompanying drawings, in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Figure 1 is a bottom plan view of a boat equipped with a propelling and steering means constructed in accordance with the invention and illustrating the steering means set for making a right-hand turn;

Fig. 2 is a side view thereof.

Fig. 3 is a diagrammatic view of the steering mechanism and its controlling means;

Fig. 4 is a rear view;

Fig. 5 is a fragmentary detail side view particularly illustrating one of the forward side deflector blades;

Fig. 6 is a fragmentary top plan view thereof.

Referring to the drawings by characters of reference, 10 designates the hull of the boat which may be of any desired formation, the form shown being merely illustrative. The hull is preferably provided with an upwardly inclined forward end or bow 11 and a recessed rear end or stern 12. The propelling means consists essentially of a pair or even number of parallel propeller shafts 13 and 14, the rear ends of which extend into the recessed stern or rear end 12 of the hull 10, and which ends of the propeller shaft are respectively formed with oppositely disposed spiral blades 15 and 16, it being understood that the shafts are designed to be turned in opposite directions. The forward and rear extremities 17 and 18 of the blades are tapered or inclined from their maximum central diameter to a point where they merge into the shaft. In practice it is intended that only the lower portion or half of each blade be disposed or submerged in the water while the upper or remaining half be disposed out of the water in order to position only the active driving portion within the water, thereby decreasing or minimizing the resistance offered to the forward travel of the boat. The spiral blades are oppositely disposed and turn in contrary directions so that the tendency in one to turn the boat laterally may be balanced by an equal and opposite tendency in the other. The tapered off or inclined terminal ends 17 and 18 serve as a means for eliminating undue disturbance of the ends in entering or leaving the water.

The steering mechanism includes a pair of laterally spaced rear rudder blades 19 and 20 and forward side deflector blades 21 and 22. The rear rudder blades are mounted on rudder posts or shafts 23 and 24, which are disposed respectively at approximately a 45° angle, the blades being of substantially rectangular formation and so mounted that when the blades are turned with their axes parallel to the line of travel of the boat, the same will be disposed out of or above the level of the water. It is obvious that when the rudder blades are swung transversely to the path of travel of the boat, a portion due to their angular mounting, will be brought into contact with or submerged in the water to set up an active steering function. The side deflector blades 21 and 22 are also mounted on shafts 25 and 26 which are disposed approximately on a 45° angle and said blades are so mounted that when not in active use, they are received in depressions or recesses 27 in the sides of the hull.

In practice, it is proposed to operate or move the right rudder and deflector blades in unison, and the left rudder and left deflector blade in unison, and to this end the steering mechanism includes a controlling means consisting of a pair of steering wheels 28 and 29. The steering wheel 28 is mounted on a steering post 30, which is connected by a sprocket and chain connection 31 with a longitudinally extending shaft 32 mounted on the left or port side of the hull. The shaft 32 is provided at its forward end with a miter gear 32 and at its rear end with a miter gear 34. The miter gear 33 meshes with the teeth of a segment 35 carried by the deflector blade shaft 25. The miter gear 34 meshes with a bevel pinion 36 on a shaft 37, which is provided at its opposite end with a miter gear 38 meshing with the teeth of a segment 39 provided on the rudder post 23. The steering post 30 preferably extends through the hollow steering post 40 of the steering wheel 29, and the hollow steering post 40 is connected by a sprocket-and-chain connection 41 with a shaft 42 mounted longitudinally on the right or starboard side of the hull 10. The shaft 42 is provided at its forward and rear ends with miter gears 43 and 44, the former meshing with the teeth of a segment 45 secured to the upper end of the shaft 26 of the right deflector blade 22. The latter miter gear 44 meshes with a beveled pinion 46 on a shaft 47 which is provided at its inner end with a miter gear 48. The miter gear 48 meshes with the teeth of a segment 49 which is secured to the upper end of the rudder post 24.

In use and operation, it is assumed that the propellers turning in opposite directions will maintain the boat in a normally straight course in which instance both of the rudders and both of the deflector blades will be disposed in a normal inactive position out of contact with the water and will be used only in event of deviation from the true course or for the purpose of making a turn. If a right turn is to be made, the steering wheel 28 is manipulated to swing the rudder 19 downwardly as illustrated, and, at the same time, to swing the deflector blade 21 outwardly and downwardly, the combined action of which blades will serve to facilitate the making of an extremely short turn while the deflector blade will reduce to a minimum the possibility of upsetting, due to the fact that the resistance of the water will exert a force on said deflector blade and tend to lift that side of the boat, counteracting the tendency to lift the side toward which the turn is being made. If a left turn is to be made, the steering wheel 29 is manipulated.

What is claimed is:—

1. The combination with a boat having propelling means consisting of a pair of oppositely driven oppositely spiralled blades, of a steering mechanism including a pair of rudder blades each mounted upon a laterally angular fulcrum in rear of each of the propellers, each of said blades normally swung to an inactive position above the water and swingable to an active position in the water.

2. The combination with a boat having propelling means consisting of a pair of oppositely driven oppositely spiralled blades, of a steering mechanism including a pair of rudder blades each mounted upon a laterally angular fulcrum in the rear of each of the propellers, each of said blades normally swung to an inactive position above the water and swingable to an active position in the water, and a pair of angularly mounted side deflector blades adjacent the bow of the boat.

3. The combination with a boat having propelling means consisting of a pair of oppositely driven oppositely spiralled blades, of a steering mechanism including a pair of rudder blades each mounted upon a laterally angular fulcrum in the rear of each of the propellers, each of said blades normally swung to an inactive position above the water and swingable to an active position in the water, a pair of angularly mounted side deflector blades adjacent the bow of the boat, and means of connection between the rudder and deflector blades of each side, respectively.

4. A steering mechanism for boats, including a pair of rudder blades each mounted upon a laterally angular fulcrum, each of said blades adapted to be normally swung to an inactive position above the water line and swingable to an active submerged position in the water.

5. A steering mechanism for boats, including a pair of angularly mounted rudder blades, each normally swung to an inactive position above the water line and swingable to an active submerged position in the water, a pair of angularly mounted side deflector blades adjacent the forward end of the boat, means of connection between the rudder and deflector blades of each side, respectively, and independent means for actuating each set of rudder and deflector blades.

WILLIAM J. ROE.